(12) United States Patent
Sawai

(10) Patent No.: US 10,900,609 B2
(45) Date of Patent: Jan. 26, 2021

(54) HIGH-PRESSURE CONTAINER

(71) Applicant: TOYOTA JIDOSHA KABUSHIKI KAISHA, Toyota (JP)

(72) Inventor: Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 15/850,270

(22) Filed: Dec. 21, 2017

(65) Prior Publication Data

US 2018/0195668 A1 Jul. 12, 2018

(30) Foreign Application Priority Data

Jan. 6, 2017 (JP) .................................. 2017-001444

(51) Int. Cl.
*F17C 1/02* (2006.01)
*F17C 13/06* (2006.01)
*F17C 1/00* (2006.01)

(52) U.S. Cl.
CPC .................. *F17C 1/02* (2013.01); *F17C 1/00* (2013.01); *F17C 13/06* (2013.01); *F17C 2201/0104* (2013.01); *F17C 2201/0119* (2013.01); *F17C 2201/0138* (2013.01); *F17C 2201/056* (2013.01); *F17C 2203/012* (2013.01); *F17C 2203/0604* (2013.01); *F17C 2203/066* (2013.01); *F17C 2203/0619* (2013.01); *F17C 2203/0646* (2013.01); *F17C 2203/0648* (2013.01); *F17C 2203/0665* (2013.01); *F17C 2203/0668* (2013.01); *F17C 2205/0142* (2013.01); *F17C 2205/0146* (2013.01); *F17C 2205/0305* (2013.01); *F17C 2209/234* (2013.01); *F17C 2221/012* (2013.01); *F17C 2221/035* (2013.01); *F17C 2223/0123* (2013.01); *F17C 2223/0153* (2013.01); *F17C 2270/0178* (2013.01); *F17C 2270/0184* (2013.01); *Y02E 60/32* (2013.01)

(58) Field of Classification Search
CPC .... F17C 1/02; F17C 1/06; F17C 1/005; F17C 1/00; F17C 13/06
See application file for complete search history.

(56) References Cited

U.S. PATENT DOCUMENTS

| 2,870,794 | A | * | 1/1959 | Thaxton | ................ | F16L 55/136 |
| | | | | | | 138/90 |
| 3,073,475 | A | * | 1/1963 | Fingerhut | ................ | F17C 1/16 |
| | | | | | | 220/590 |
| 5,797,431 | A | * | 8/1998 | Adams | .................. | F16L 55/136 |
| | | | | | | 138/89 |

FOREIGN PATENT DOCUMENTS

| EP | 0218049 A1 | 4/1987 |
| JP | 2006-009982 A | 1/2006 |

(Continued)

*Primary Examiner* — Steven A. Reynolds
*Assistant Examiner* — Javier A Pagan
(74) *Attorney, Agent, or Firm* — Oliff PLC

(57) ABSTRACT

A high-pressure container has a body part, and a cap inserted in the body part, and the body part has a cylindrical liner, and a reinforcement layer provided on an outer circumferential surface of the liner for reinforcing the liner. The cap has a contact portion that contacts with an inner circumferential surface of the liner, a through-hole that communicates the inside of the body part with the outside, and a projecting portion that is pressed outward in radial directions of the body part, and bites into the reinforcement layer, so as to inhibit the cap from moving in the axial direction.

7 Claims, 4 Drawing Sheets

(56) References Cited

FOREIGN PATENT DOCUMENTS

| JP | 2015-158243 | A | 9/2015 | | |
|----|----|----|----|----|----|
| JP | 6096136 | * | 3/2017 | ........... | Y02E 60/321 |
| WO | 2010/085154 | A1 | 7/2010 | | |
| WO | 2017/031233 | A1 | 2/2017 | | |

* cited by examiner

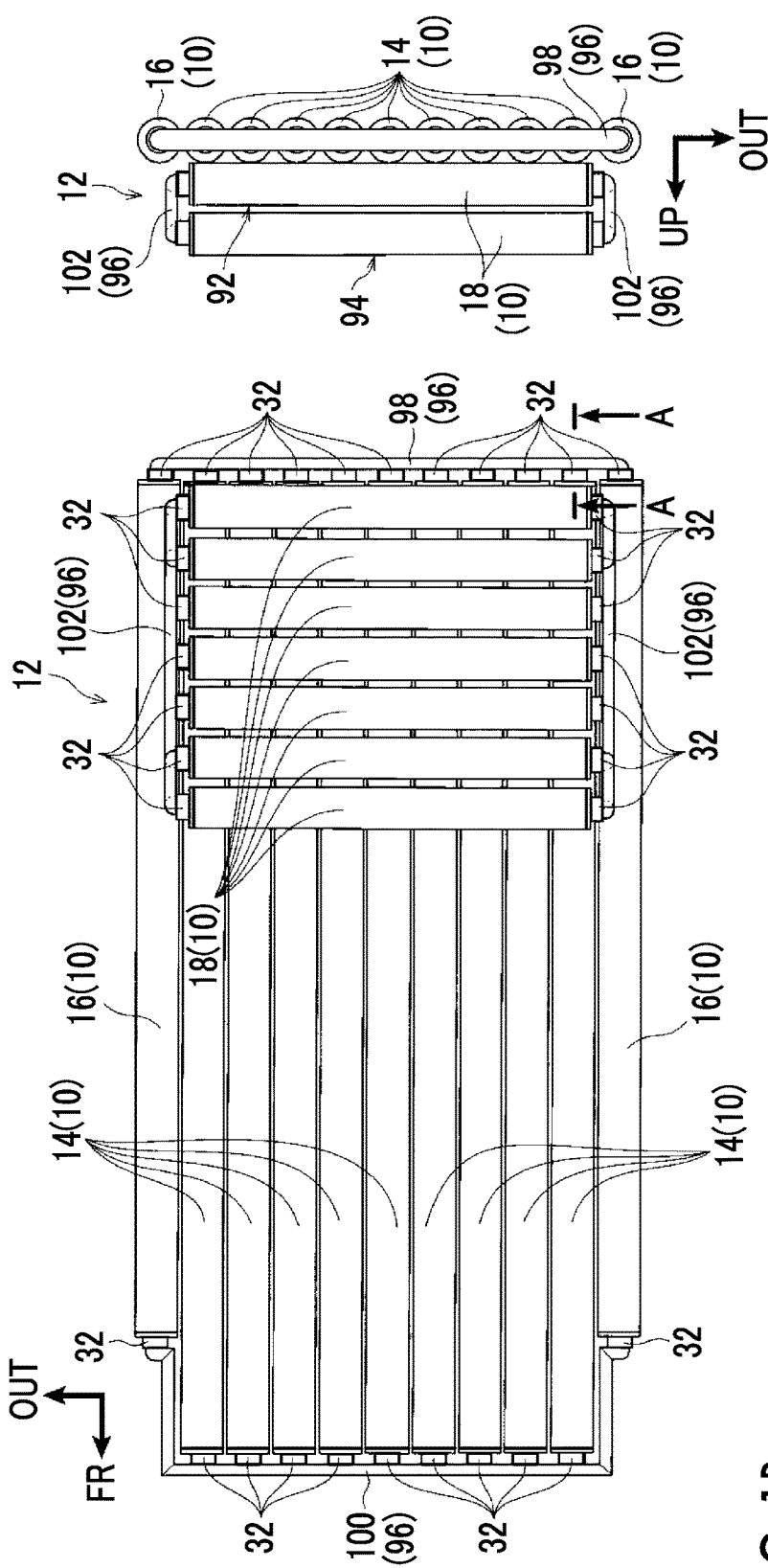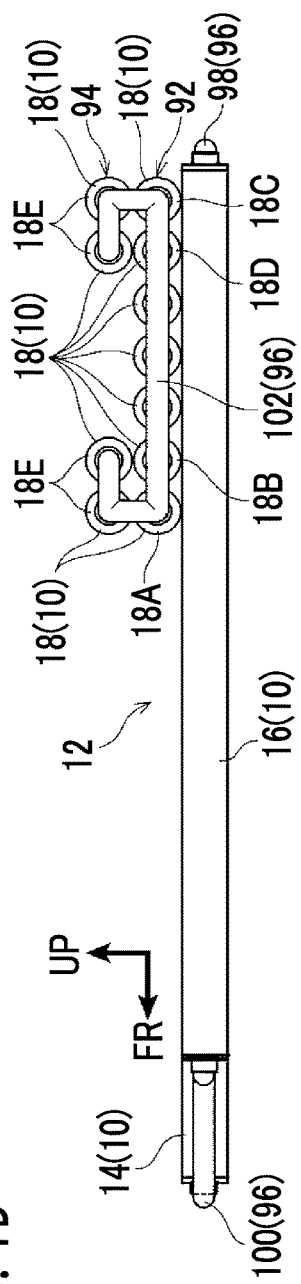

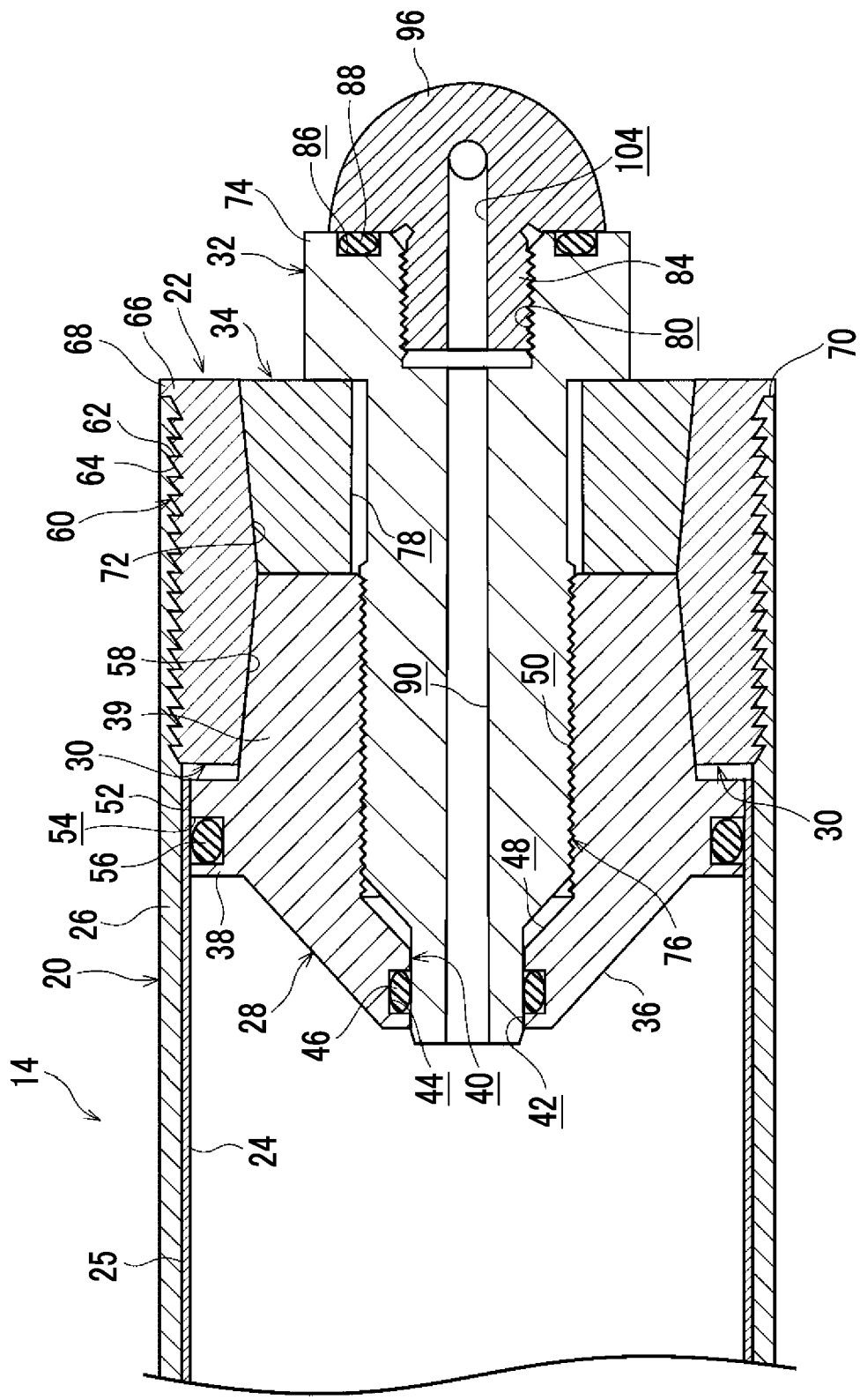

HIGH-PRESSURE CONTAINER

INCORPORATION BY REFERENCE

The disclosure of Japanese Patent Application No. 2017-001444 filed on Jan. 6, 2017 including the specification, drawings and abstract is incorporated herein by reference in its entirety.

BACKGROUND

1. Technical Field

The disclosure relates to a high-pressure container.

2. Description of Related Art

A hydrogen gas accumulator is disclosed in Japanese Patent Application Publication No. 2015-158243 (JP 2015-158243 A). The hydrogen gas accumulator includes a liner formed in a cylindrical shape, a reinforcement layer provided on the outer periphery of the liner, and caps inserted into axially opposite end portions of the liner. The cap has an outer circumferential surface that is externally threaded, and the externally threaded surface is engaged with an internally threaded inner circumferential surface of the liner, so that the axially opposite end portions of the liner are gas-tightly sealed. With this arrangement, hydrogen can be stored in the inside of the liner.

SUMMARY

However, in the arrangement disclosed in JP 2015-158243 A, if high-pressure hydrogen is stored in the inside of the liner, a load is applied to the caps, along the axially outer sides of the liner; therefore, a load is applied to an internally threaded portion of the liner. Accordingly, the thickness of the liner needs to be increased so that the liner can bear the load. However, if the thickness of the liner is increased, the volume of the inside of the liner is reduced, and the amount of hydrogen that can be stored inside the liner may be reduced. Thus, in the related art, there is some room for improvement in terms of this point.

The disclosure provides a high-pressure container that can store high-pressure fluid, without reducing the volume of the inside thereof.

A high-pressure container according to one aspect of the disclosure includes a body part having a liner formed in a cylindrical shape, and a reinforcement layer that is provided on an outer circumferential surface of the liner and reinforces the liner, and a cap inserted in the body part. The cap has a contact portion that is in abutting contact with an inner circumferential surface of the liner, a communicating portion that communicates an inside of the body part with an outside of the body part, and a projecting portion that is pressed outward in radial directions of the body part, and bites into the reinforcement layer.

With the above arrangement, the fluid can be stored in the inside of the liner, via the communicating portion, and the contact portion is in abutting contact with the inner circumferential surface of the liner, so that the stored fluid is inhibited from leaking to the outside of the liner.

In the high-pressure container as described above, the cap has the projecting portion. The projecting portion is pressed outward in the radial directions of the body part, thereby to bite into the reinforcement layer, so that the cap is inhibited from moving in the axial direction of the body part (which will be simply referred to as "axial direction"). Therefore, when the high-pressure fluid is stored in the inside of the body part, such that a load is applied to the cap in the axial direction, the load is transmitted to the reinforcement layer, so that a load applied from the cap to the liner is reduced. Accordingly, the thickness of the liner can be reduced, and reduction of the volume of the inside of the liner can be curbed. Thus, the high-pressure container according to the above aspect of the disclosure has an excellent effect that it can store high-pressure fluid, without reducing the volume of the inside thereof.

In the high-pressure container as described above, the projecting portion of the cap may include a plurality of saw teeth that projects outward in radial directions of the body part and bites into the reinforcement layer. Each of the saw teeth may have a reaction face that faces outward in an axial direction of the body part, and the reaction face may be formed to be generally orthogonal to the axial direction of the body part.

With the above arrangement, when a load is applied along the axially outer side from the high-pressure fluid stored inside the body part to the cap, the reaction faces of the saw teeth that bite into the reinforcement layer receive greater reaction force than that in the case where the reaction faces are formed at an angle. Namely, since the cap is less likely or unlikely to be displaced radially outward, higher-pressure fluid can be stored inside the body part. Thus, the high-pressure container as described above has an excellent effect that the amount of the fluid stored therein can be increased.

In the high-pressure container as described above, the reinforcement layer of the body part may be formed of a fiber reinforced resin containing carbon fibers, and the carbon fibers may be arranged in a circumferential direction of the body part, on an inner circumferential surface side of the reinforcement layer.

With the above arrangement, the projecting portion can easily bite into regions other than the carbon fibers, of the fiber reinforced resin, without cutting the carbon fibers. Namely, the above arrangement makes it easy for the projecting portion to bite into the reinforcement layer. Thus, the high-pressure container as described above has an excellent effect that the cap can be easily fixed to the body part.

In the high-pressure container as described above, the projecting portion of the cap may be able to be displaced outward generally in the radial directions of the body part, under a pressure received from the inside of the body part.

With the above arrangement, as the pressure of the fluid stored inside the body part is higher, the projecting portion is more likely to be displaced outward generally in the radial directions of the body part, and the amount of the projecting portion biting into the reinforcement layer is increased. As a result, the cap is less likely or unlikely to be displaced axially outward, in proportion to the pressure of the fluid stored inside the body part; therefore, fluid having an even higher pressure can be stored inside. Thus, the high-pressure container as described above has an excellent effect that the amount of the fluid stored therein can be further increased.

In the high-pressure container as described above, the projecting portion of the cap may have a tapered portion on one side remote from the reinforcement layer, and the tapered portion may be inclined inward in the radial directions of the body part, as viewed in a direction toward one side in an axial direction of the body part. The cap may include a pressing part that is in abutting contact with the tapered portion, and the pressing part may be configured to press the projecting portion against the reinforcement layer, such that the projecting portion bites into the reinforcement layer.

With the above arrangement, when the cap is fitted into the body part, the pressing portion is moved to one side in the axial direction and held in position, so that the tapered portion, and ultimately the projecting portion, are displaced radially outward. As a result, the projecting portion is pressed outward in the radial directions the body part, and held in a condition where the projecting portion bites into the reinforcement layer. Thus, the high-pressure container as described above has an excellent effect that the fluid tightness between the cap and the body part can be maintained.

In the high-pressure container as described above, the liner of the body part may be formed of aluminum alloy or nylon resin.

With the above arrangement, the weight of the body part can be reduced. Thus, the high-pressure container as described above has an excellent effect that the portability can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1A is a plan view showing a tank module constituted by high-pressure containers according to a first embodiment, as viewed from above a vehicle;

FIG. 1B is a side view showing the tank module of FIG. 1A, as viewed from one side of the vehicle;

FIG. 1C is a rear view showing the tank module of FIG. 1A, as viewed from the rear of the vehicle;

FIG. 2 is an enlarged cross-sectional view showing a condition taken along line A-A in FIG. 1A;

DETAILED DESCRIPTION OF EMBODIMENTS

Figure 3:
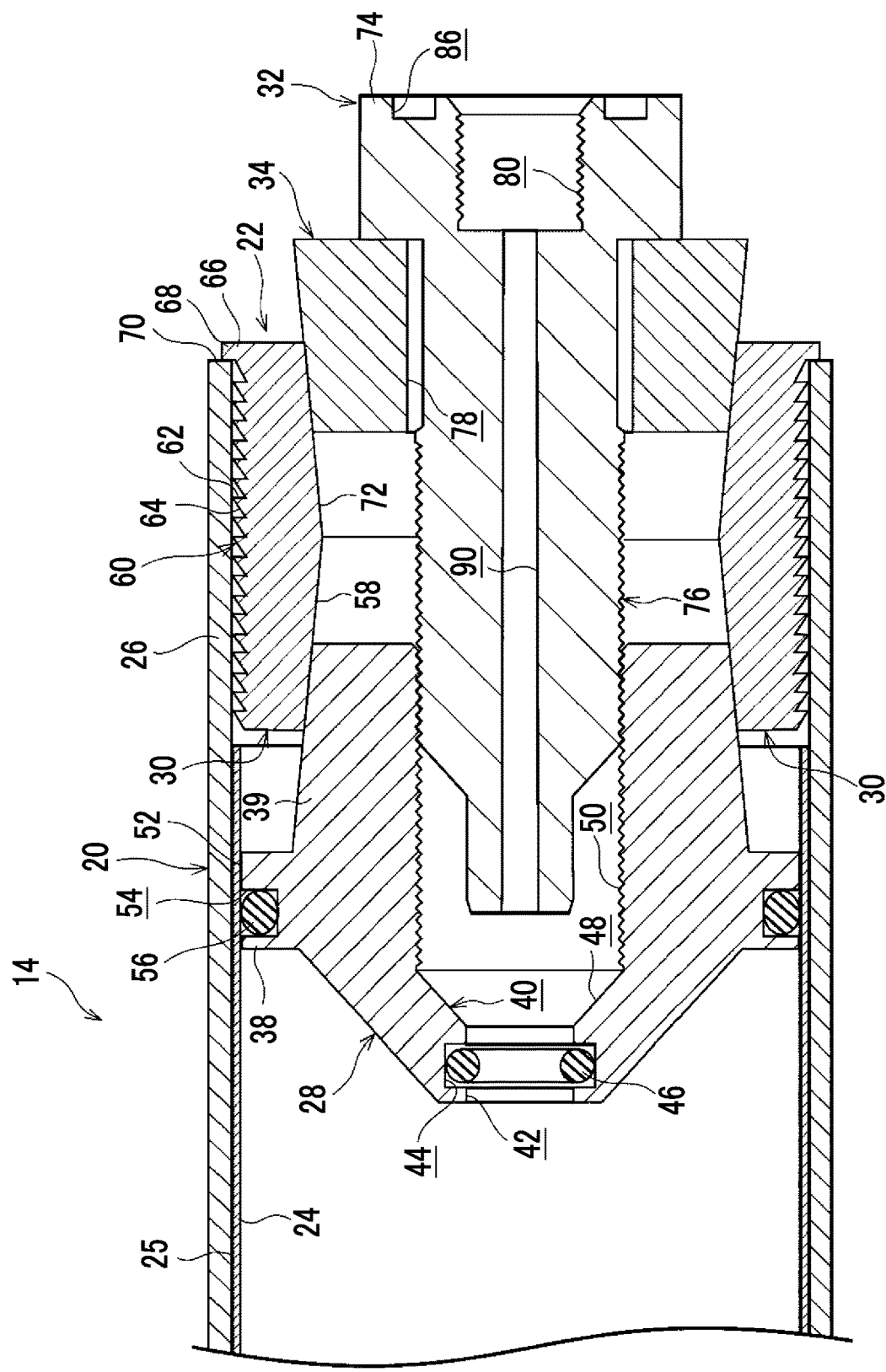
FIG. 3 is an enlarged cross-sectional view showing a condition before fastening of a cap, in comparison to FIG. 2.

Referring to FIG. 1A through FIG. 3, a high-pressure container 10 according to a first embodiment of the disclosure will be described. In the figures, arrow FR denotes the front side in the vehicle longitudinal direction, and arrow OUT denotes the outer side in the vehicle width direction, while arrow UP denotes the upper side in the vehicle vertical direction.

As shown in FIG. 1A, FIG. 1B, and FIG. 1C, a tank module 12 is provided by assembling a plurality of high-pressure containers 10 together. More specifically, the tank module 12 consists of first high-pressure containers 14, second high-pressure containers 16, and third high-pressure containers 18. The tank module 12 is located on the vehicle lower side of a floor panel (not shown) of a fuel cell vehicle, as one example, such that it extends along the floor panel.

Each of the first high-pressure containers 14 is formed in a cylindrical shape having an axial direction (longitudinal direction) corresponding to the vehicle longitudinal or frontback direction. As shown in FIG. 2, the first high-pressure container 14 includes a body part 20 formed in a cylindrical shape, and caps 22 provided at axially outer, opposite end portions of the body part 20. The body part 20 has a liner 24 formed in a cylindrical shape and made of aluminum alloy, as one example, and a reinforcement layer 26 formed by winding a sheet-like CFRP (carbon fiber reinforced resin) around an outer circumferential surface 25 of the liner 24. On the inner circumferential surface side of the reinforcement layer 26, carbon fibers (not shown) within the fiber reinforced resin are arranged along the circumferential direction of the liner 24, or the body part 20. In a region of the reinforcement layer 26 other than the inner circumferential surface, some carbon fibers are arranged along the circumferential direction of the liner 24, and other carbon fibers in an amount that is a half of the amount of the carbon fibers arranged in the circumferential direction are arranged in the axial direction so as to intersect with the circumferentially arranged carbon fibers. Further, axially outer, opposite end portions of the reinforcement layer 26 extend axially outward from opposite axial end portions of the liner 24.

Each of the caps 22 has a contact portion 28, a projection holding part 30, a fastener 32, and a pressing part 34. The contact portion 28 has a generally cylindrical, contact main body portion 36, and a packing receiving portion 38 that protrudes radially outward from the outer periphery of the contact main body portion 36. An axially inner portion of the contact main body portion 36 is tapered toward its axially inner end face, to be thus formed in a generally conical shape. The contact main body portion 36 is also formed with a fastening hole 40 that extends in the axial direction through its radially middle portion. A fastening-hole inside portion 42 that provides an axially inner portion of the fastening hole 40 is provided with a groove portion 44 that is recessed radially outward, and an O-ring 46 received in the groove portion 44. The fastening hole 40 also has a radius increasing portion 48 formed on the axially outer side of the fastening-hole inside portion 42 such that its radius increases, or the portion 48 expands radially outward from the fastening-hole inside portion 42, and a fastening-hole outside portion 50 that extends axially outward with a generally constant radius from the radius increasing portion 48. An inner circumferential surface of the fastening-hole outside portion 50 is internally threaded.

An outer circumferential surface 52 of the packing receiving portion 38 is in abutting contact with an inner circumferential surface of the liner 24, and a groove portion 54 is formed in a part of the outer circumferential surface 52. An O-ring 56 that is elastically deformed in the radial direction of the liner 24 is received in the groove portion 54.

The contact main body portion 36 has a pressing portion 39 that provides an axially outer portion located axially outward of the packing receiving portion 38. An outer circumferential surface of the pressing portion 39 is inclined radially inward of the contact main body portion 36, as viewed in a direction toward the axially outer side. The angle of inclination of the outer circumferential surface is substantially equal to the angle of inclination of a tapered portion 58 that will be described later.

The projection holding part 30 is formed in a generally cylindrical shape, and is provided on the outer peripheral side of a portion of the contact main body portion 36 located axially outward of the packing receiving portion 38 and the pressing part 34, and on a portion of the body part 20 which consists solely of the reinforcement layer 26 (on a portion of the body part 20 located on the axially outer side of each of the axially opposite end portions of the liner 24). The projection holding part 30 is divided into two or more sections as viewed in the axial direction, by partition lines (not shown) along the axial direction, and is formed at its outer circumferential surface with a plurality of saw teeth 60 as projections. The saw teeth 60 are continuously formed along the circumferential direction of the projection holding part 30, and reaction faces 62 that provide axially outer faces of the saw teeth 60 are formed so as to be orthogonal to the axial direction. Also, inclined faces 64 that provide axially inner faces of the saw teeth 60 are inclined radially outward of the projection holding part 30, as viewed in a direction toward the axially outer side. The angle of inclination of a distal end portion of each of the saw teeth 60, which is formed by the inclined face 64 and the reaction face 62, is an acute angle.

A flange portion 68 that extends radially outward of the saw teeth 60 is formed at an axially outer end portion 66 of the projection holding part 30. An axially inner face of the flange portion 68 is in abutting contact with an axially outer end face 70 of the reinforcement layer 26.

The projection holding part 30 has tapered portions 58, 72 formed at its inner circumferential surface. The tapered portion 58 is formed on the axially inner side in the inner circumferential surface of the projection holding part 30, and is inclined radially inward, as viewed in a direction toward the axially outer side. The tapered portion 72 is formed on the axially outer side in the inner circumferential surface of the projection holding part 30, and is inclined radially inward, as viewed in a direction toward the axially inner side. A boundary between the tapered portion 58 and the tapered portion 72 is located at substantially the middle in the axial direction of the inner circumferential surface of the projection holding part 30.

The pressing part 34 is formed in a generally cylindrical shape such that its axial length is substantially equal to the axial length of the tapered portion 72. The pressing part 34 is inserted in the projection holding part 30. An outer circumferential surface of the pressing part 34 is inclined radially inward, as viewed in a direction toward the axially inner side, at the same angle as the tapered portion 72. In a condition where the cap 22 is fitted in the body part 20, as shown in FIG. 2, the pressing part 34 is in abutting contact with the tapered portion 72, and presses the projection holding part 30 against the reinforcement layer 26, such that the saw teeth 60 formed on the projection holding part 30 bite into the reinforcement layer 26. Meanwhile, a through-hole 78 inside the pressing part 34 has substantially the same diameter as that of the fastening-hole outside portion 50 of the contact main body portion 36.

The fastener 32 is provided on the axially outer side of the pressing part 34, and an axially inner face of a head portion of the fastener 32 is in abutting contact with an axially outer face of the pressing part 34. A shaft portion 76 of the fastener 32 is inserted in the through-hole 78 of the pressing part 34 and the fastening hole 40 of the contact main body portion 36. The shaft portion 76 is externally threaded, and the external thread or male thread is engaged with the internal thread or female thread of the fastening-hole outside portion 50 of the contact main body portion 36, so that the pressing part 34, contact main body portion 36, and the projection holding part 30 are fastened together. A distal end portion of the fastener 32 is formed with substantially the same diameter as the fastening-hole inside portion 42, and the distal end portion of the fastener 32 is inserted in the fastening-hole inside portion 42, so that the O-ring 46 in the groove portion 44 is elastically deformed radially outward.

A fastened portion 80 is formed in the head portion 74 of the fastener 32. The fastened portion 80 is in the form of a columnar groove with a bottom, which is open toward the axially outer side, and an inner circumferential surface of the fastened portion 80 is internally threaded, so as to be engaged with a fastening portion 84 of a common rail 96 that will be described later. Also, a groove 86 is formed on the radially outer side of the fastened portion 80, in an axially outer face of the head portion 74. An O-ring 88 is received in the groove 86. The fastener 32 is formed with a through-hole 90 as the communicating portion that extends through the fastener 32 in the axial direction.

Next, the manner of fastening the cap 22 will be described. As shown in FIG. 3, in a condition where the fastener 32 of the cap 22 is loosened, the pressing portion 39 of the contact portion 28 is in abutting contact with the axially inner side of the tapered portion 58 of the projection holding part 30, and the pressing part 34 is in abutting contact with the axially outer side of the tapered portion 72 of the projection holding part 30. Accordingly, the projection holding part 30 is located at a radially inner position as compared with the projection holding part 30 (see FIG. 2) in a condition where the fastener 32 is fastened. Accordingly, when the cap 22 is inserted into the body part 20, fastening of the fastener 32 to the contact portion 28 is loosened to such an extent that tips of the saw teeth 60 are in abutting contact with the inner circumferential surface of the reinforcement layer 26. In this manner, the projection holding part 30, and ultimately the cap 22, can be inserted into the body part 20. At this time, the flange portion 68 of the projection holding part 30 is brought into abutting contact with the end face 70 of the reinforcement layer 26, so that further movement of the projection holding part 30 into of the body part 20 is restricted or inhibited.

When the fastener 32 is fastened, after the cap 22 is inserted into the body part 20, the contact portion 28 moves axially outward, and the pressing part 34 moves axially inward. Accordingly, the pressing portion 39 of the contact portion 28 and the pressing part 34 move along the tapered portions 58, 72, respectively, so as to displace the projection holding part 30 radially outward. As a result, the saw teeth 60 of the projection holding part 30 bite into the inner circumferential surface of the reinforcement layer 26, as shown in FIG. 2. In this manner, the cap 22 is fixed to the body part 20, and a hermetically sealed condition is maintained between the cap 22 and the body part 20. In this connection, the tips of the saw teeth 60 bite into between carbon fibers in the inner circumferential surface of the reinforcement layer 26 and carbon fibers located adjacent to the same surface.

As shown in FIG. 1A and FIG. 1C, a plurality of (nine in this embodiment) first high-pressure containers 14 each constructed as described above are arranged side by side in the vehicle width direction.

As shown in FIG. 1A, a pair of second high-pressure containers 16 are placed on the right and left sides, such that the first high-pressure containers 14 are sandwiched between the second high-pressure containers 16 from the outside in the vehicle width direction. Each of the second high-pressure containers 16 basically has the same configuration as the first high-pressure container 14. More specifically, like the first high-pressure container 14, the second high-pressure container 16 is formed in a cylindrical shape having the same diameter as the first high-pressure container 14 and extending in the vehicle longitudinal direction as its axial direction. The length of the second high-pressure container 16 as measured in the axial direction is set to be shorter than that of the first high-pressure container 14. The first high-pressure containers 14 and the second high-pressure containers 16 are positioned such that their rear end portions in the axial direction are located at substantially the same position in the vehicle longitudinal direction.

As shown in FIG. 1A and FIG. 1B, a plurality of (eleven in this embodiment) third high-pressure containers 18 are arranged side by side in the vehicle longitudinal direction. Each of the third high-pressure containers 18 basically has the same configuration as the first high-pressure container 14. More specifically, the third high-pressure container 18 is formed in a cylindrical shape having the same diameter as the first high-pressure container 14 and extending in the vehicle width direction as its axial direction. The axial length of the third high-pressure container 18 is set to be substantially equal to a distance from one end portion of the plurality of the first high-pressure containers 14 arranged in the vehicle width direction, to the other end portion in the vehicle width direction. As shown in FIG. 1B, the third high-pressure containers 18 are arranged in a first-level portion 92 mounted on vehicle rear end portions of the first high-pressure containers 14, and a second-level portion 94 mounted on the first-level portion 92. The first-level portion 92 includes a third high-pressure container 18A that provides a vehicle front end portion thereof, a third high-pressure container 18B located adjacent to the third high-pressure container 18A, a third high-pressure container 18C that provides a vehicle rear end portion of the first-level portion 92, and a third high-pressure container 18D located adjacent to the third high-pressure container 18C. The second-level portion 94 consists of third high-pressure containers 18E mounted on the third high-pressure containers 18A, 18B, 18C, 18D, respectively.

The respective caps 22 of the first high-pressure containers 14, second high-pressure containers 16, and the third high-pressure containers 18 are fastened to a plurality of common rails 96. The common rails 96 include a first common rail 98 that connects all of the caps 22 on the vehicle rear side of the first high-pressure containers 14 and the second high-pressure containers 16, a second common rail 100 that connects all of the caps 22 on the vehicle front side of the first high-pressure containers 14 and the second high-pressure containers 16, and a pair of right and left third common rails 102 that connect all of the caps 22 on both sides in the vehicle width direction of the third high-pressure containers 18. Each of the common rails 96 has fastening portions 84 formed as integral parts at positions corresponding to the caps 22 of the respective high-pressure containers 10, and each of the fastening portions 84 is formed with a channel 104 corresponding to the through-hole 90 of the corresponding cap 22, as shown in FIG. 2. The channels 104 formed in the fastening portions 84 are connected with each other, so that the interiors of the first high-pressure containers 14 and the second high-pressure containers 16 communicate with each other, and the interiors of the third high-pressure containers 18 communicate with each other. The common rails 96 are connected to a fuel cell stack or stacks, supply pipe or pipes, and so forth, via valves.

Next, the operation and effects of this embodiment will be described.

In this embodiment, as shown in FIG. 2, the body part 20 has the liner 24 formed in a cylindrical shape, and the reinforcement layer 26 provided on the outer circumferential surface of the liner 24, for reinforcing the liner 24. The caps 22 are inserted in the body part 20, and each of the caps 22 has the contact portion 28 that is in abutting contact with the inner circumferential surface of the liner 24, and the through-hole 90 that communicates the inside of the body part 20 with the outside thereof. Accordingly, fluid (hydrogen in this embodiment) can be stored in the inside of the liner 24 via the communicating portion, and the stored fluid is inhibited from leaking to the outside of the liner 24, owing to abutting contact of the contact portion 28 with the inner circumferential surface of the liner 24.

Here, the cap 22 has the saw teeth 60. Since the saw teeth 60 bite into the reinforcement layer 26 when they are pressed outward in radial directions of the body part 20, the cap 22 is inhibited from moving along the axial direction. Therefore, when high-pressure fluid is stored within the body part 20, and a load is applied to the cap 22 in the axial direction, the load is transmitted to the reinforcement layer 26, so that a load applied from the cap 22 to the liner 24 is reduced. Accordingly, the thickness of the liner 24 can be reduced, and therefore, reduction of the volume of the inside of the liner 24 can be curbed. Thus, it is possible to store the high-pressure fluid, without reducing the volume of the inside.

The reaction faces 62 that provide the axially outer faces of the saw teeth 60 of the cap 22 are formed so as to be generally orthogonal to the axial direction. Therefore, when a load is applied axially outward from the high-pressure fluid stored within the body part 20 to the cap 22, the reaction faces 62 of the saw teeth 60 that bite into the reinforcement layer 26 receive larger reaction force, as compared with the case where the reaction faces 62 are formed at an angle. Namely, since the cap 22 is less likely or unlikely to be displaced axially outward, the higher-pressure fluid can be stored inside the body part 20. Thus, the amount of the fluid stored inside the body part 20 can be increased.

Further, the reinforcement layer 26 of the body part 20 is formed of fiber reinforced resin, and carbon fibers in the fiber reinforced resin are arranged in the circumferential direction of the body part 20, on the inner circumferential surface side of the reinforcement layer 26. Therefore, the saw teeth 60 are likely to bite into regions other than the carbon fibers in the fiber reinforced resin, without cutting the carbon fibers. Namely, the saw teeth 60 can easily bite into the reinforcement layer 26. Thus, the cap 22 can be easily fixed to the body part 20.

Since the carbon fibers in the fiber reinforced resin are arranged in the circumferential direction of the body part 20, the saw teeth 60 that bite into the fiber reinforced resin that provides the reinforcement layer 26 from the inner circumferential surface side can be brought into abutting contact with the carbon fibers in the axial direction. Accordingly, when a load is applied axially outward from the high-pressure fluid stored within the body part 20 to the cap 22, the saw teeth 60 of the cap 22 can also obtain reaction force from the carbon fibers; therefore, the cap 22 is even less likely or unlikely to be displaced axially outward. Therefore, the even higher-pressure fluid can be stored inside the body part 20. Thus, the amount of the fluid stored inside the body part 20 can be further increased.

Furthermore, the projection holding part 30 that holds the saw teeth 60 in the cap 22 is provided with the tapered portions 58, 72 that are inclined inward in radial directions of the body part 20, from one side to the other side in the axial direction, and the cap 22 includes the pressing part 34 and the contact main body portion 36 that contact with the tapered portions 72, 58, respectively. Accordingly, when the cap 22 is fitted in the body part 20, the pressing part 34 and the contact main body portion 36 are moved to one side in the axial direction and held in position, so that the tapered portions 58, 72, and ultimately the saw teeth, are displaced radially outward, and the saw teeth 60 are pressed outward in radial directions of the body part 20, and held in a condition where the saw teeth 60 bite into the reinforcement layer 26. In this manner, the fluid tightness between the cap 22 and the body part 20 can be maintained.

Since the liner 24 of the body part 20 is formed of aluminum alloy or nylon resin, the weight of the body part 20 can be reduced. Thus, the portability can be improved.

Next, referring to FIG. 4, a high-pressure container according to a second embodiment of the disclosure will be described. The same reference numerals are assigned to substantially the same constituent elements or portions as those of the first embodiment as described above, and further explanation of these elements or portions will not be provided.

The high-pressure container 110 according to the second embodiment has the basic configuration similar to that of the first embodiment, and is characterized in that projection holding parts 114 of caps 112 are displaced under a pressure of fluid stored within the body part 20.

Figure 4:
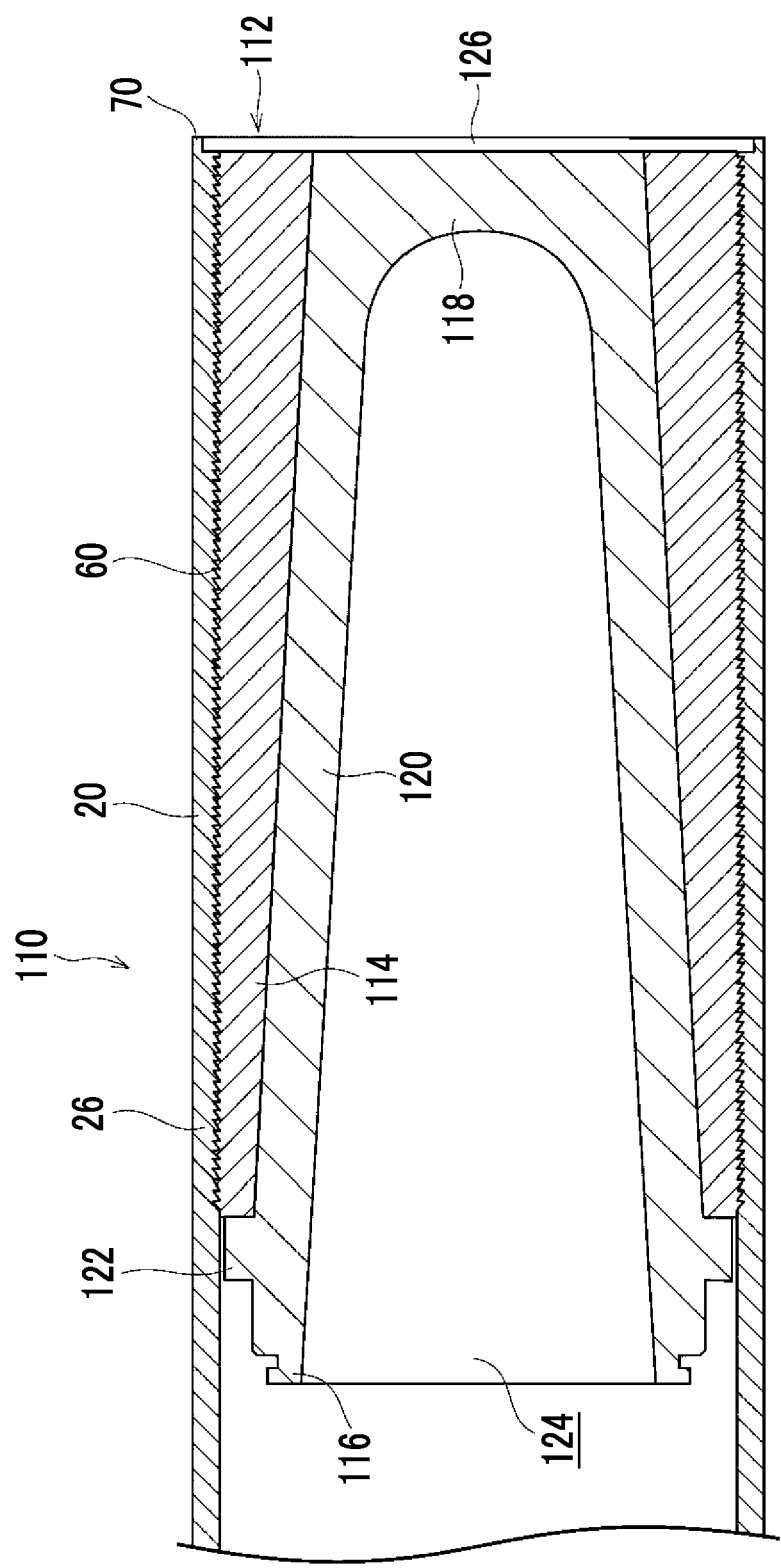
FIG. 4 is an enlarged cross-sectional view showing a principal part of a high-pressure container according to a second embodiment.

More specifically, as shown in FIG. 4, the caps 112 are inserted into axially opposite end portions of the body part 20 of the high-pressure container 110. Each of the caps 112 has a projection holding part 114, and a pressure receiving part 116. The projection holding part 114 is formed in a generally cylindrical shape, and a plurality of saw teeth 60 is formed on its outer circumferential surface. The inner circumferential surface of the projection holding part 114 is inclined radially inward, as viewed in a direction toward the axially outer side. Further, the projection holding part 114 is divided into two or more sections as viewed in the axial direction, by partition lines (not shown) that extend generally along the axial direction.

The pressure receiving part 116 is inserted within the projection holding part 114. The pressure receiving part 116 is formed in a generally cylindrical shape with a bottom, and has a bottom portion 118 located on the axially outer side, and a side wall portion 120 that is elastically deformable in generally radial directions, about the bottom portion 118. The outer circumferential surface of the side wall portion 120 is in abutting contact with the inner circumferential surface of the projection holding part 114. Also, a protruding portion 122 that protrudes radially outward is formed on the axially inner side on the outer circumferential surface of the side wall portion 120, and an axially inner end portion of the projection holding part 114 is in abutting contact with an axially outer side face of the protruding portion 122. Further, an opening 124 of the pressure receiving part 116 communicates with the inside of the body part 20. Namely, fluid in the inside of the body part 20 flows into the inside of the pressure receiving part 116, and the side wall portion 120 can be displaced generally radially outward, under the pressure of the fluid.

A lid member 126 is attached, from the axially outer side, to an axially outer end portion of the pressure receiving part 116 and an axially outer end portion of the projection holding part 114, and the lid member 126 is joined to an end face 70 of the reinforcement layer 26.

Next, the operation and effects of the second embodiment will be described.

With the above arrangement, too, the high-pressure container 110 of the second embodiment is configured similarly to the high-pressure container 10 of the first embodiment, except that the projection holding part 114 of the cap 112 is displaced under the pressure of the fluid stored within the body part 20; therefore, substantially the same effects as those of the first embodiment are obtained.

Since the projection holding part 114 of the cap 112 can be displaced outward generally in radial directions of the body part 20, under the pressure received from the inside of the body part 20, the amount by which the saw teeth 60 of the projection holding part 114 bite into the reinforcement layer 26 is increased as the pressure of the fluid stored within the body part 20 is higher. Thus, the cap 112 is less likely to be displaced axially outward, in proportion to the pressure of the fluid stored within the body part 20, so that the fluid having an even higher pressure can be stored inside the body part 20. Thus, the amount of the fluid stored inside the body part 20 can be further increased.

The cap 112 principally consists of the projection holding part 114, pressure receiving part 116, and the lid member 126, and does not require a fastener, or the like, that fastens parts of the cap 112 together. Namely, the number of pieces of components can be reduced, which contributes to reduction of the weight and the cost.

Since the opening 124 of the pressure receiving part 116 communicates with the inside of the body part 20, the fluid flows into the inside of the pressure receiving part 116, and the amount of the fluid that can be stored in the high-pressure container 110 can be increased.

In the first and second embodiments as described above, the saw teeth 60 of the projection holding part 30, 114 are formed such that the reaction faces 62 are generally orthogonal to the axial direction. However, the shape of the reaction faces 62 is not limited to this, but the reaction faces 62 may be inclined relative to the axial direction. Also, projections formed on the projection holding part 30, 114 are not limited to the saw teeth 60, but may be projections having other shapes.

While the liner 24 is formed of aluminum alloy, the material of the liner 24 is not limited to this, but the liner 24 may be made of other materials, such as nylon resin, which inhibit permeation of hydrogen inside the liner 24. Further, while hydrogen is stored within the high-pressure container 10, 110, the fluid stored in the container 10, 110 is not limited to this, but other gas, or liquid, such as LPG, may be stored in the high-pressure container 10, 110.

While the embodiments of the disclosure have been described above, the disclosure is not limited to the above embodiments, but may be embodied with various modifications other than those as described above, without departing from the principle of the disclosure.

What is claimed is:

1. A high-pressure container comprising:
    a body part having
        a liner that is cylindrical, and
        a reinforcement layer on an outer circumferential surface of the liner and that reinforces the liner; and
    a cap inserted in the body part, the cap having
        a contact portion in abutting contact with an inner circumferential surface of the liner,
        a fastener that is threaded into the contact portion and including a communicating portion that communicates an inside of the body part with an outside of the body part, and
        a projection holding part that includes a projecting portion that faces the reinforcement layer, and a first tapered portion and a second tapered portion that face away from the reinforcement layer, wherein the projecting portion is pressed outward in radial directions of the body part due to threading the fastener into the contact portion, and bites into the reinforcement layer, the first tapered portion tapering radially inward toward the second tapered portion, and the second tapered portion tapering radially inward toward the first tapered portion.

2. The high-pressure container according claim 1, wherein the projecting portion of the cap includes a plurality of saw teeth that projects outward in radial directions of the body part and bites into the reinforcement layer, each of the saw teeth having a reaction face that faces outward in an axial direction of the body part, the reaction face being formed to be generally orthogonal to the axial direction of the body part.

3. The high-pressure container according to claim 1, wherein the reinforcement layer of the body part comprises a fiber reinforced resin containing carbon fibers, and the carbon fibers are arranged in a circumferential direction of the body part, on an inner circumferential surface side of the reinforcement layer.

4. The high-pressure container according to claim 1, wherein the projecting portion of the cap is configured to be displaced outward generally in the radial directions of the body part, under a pressure received from the inside of the body part.

5. The high-pressure container according to claim 1, wherein:
   the first tapered portion and the second tapered portion are on one side remote from the reinforcement layer; and
   the cap includes a pressing part that is in abutting contact with the first tapered portion and the second tapered portion, the pressing part being configured to press the projecting portion against the reinforcement layer, such that the projecting portion bites into the reinforcement layer.

6. The high-pressure container according to claim 1, wherein the liner of the body part comprises aluminum alloy or nylon resin.

7. The high-pressure container according to claim 1, wherein one of the first tapered portion and the second tapered portion provide a surface that slides axially with respect to a surface of the contact portion due to threading the fastener into the contact portion.

\* \* \* \* \*